H. E. FOSTER.
Corn-Planter.
No. 203,025. Patented April 30, 1878.
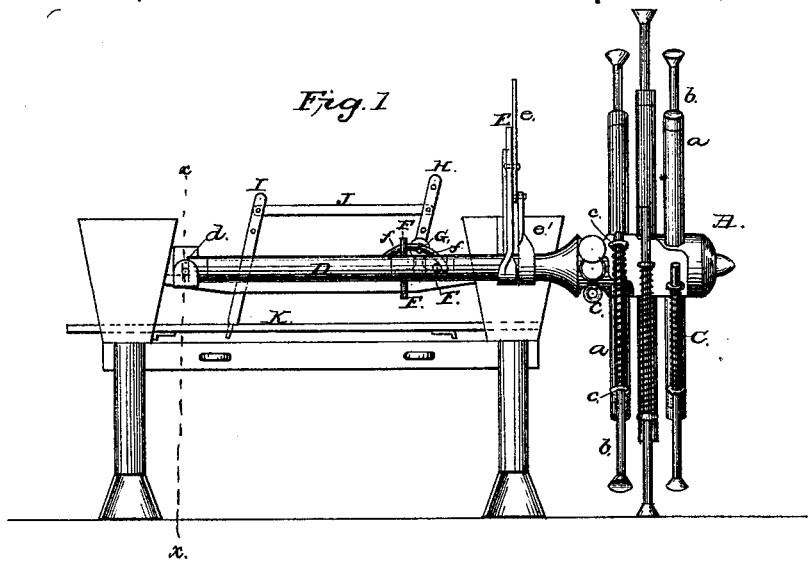
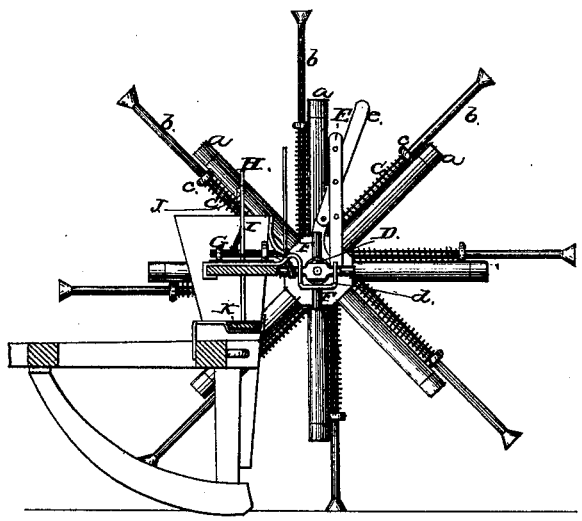
Attest:
Theo. Coleman
Chas W. Stitsher
Inventor:
Hickman E. Foster.
per Chas P. Koonsury
Atty.

UNITED STATES PATENT OFFICE.

HICKMAN E. FOSTER, OF DECATUR, ILLINOIS, ASSIGNOR OF ONE-HALF HIS RIGHT TO RUFUS C. CROCKER, OF SAME PLACE.

IMPROVEMENT IN CORN-PLANTERS.

Specification forming part of Letters Patent No. 203,025, dated April 30, 1878; application filed November 21, 1877.

*To all whom it may concern:*

Be it known that I, HICKMAN E. FOSTER, of Decatur, in the county of Macon and State of Illinois, have invented a new and useful Improvement in Corn-Planters, which improvement is fully set forth in the following specification, reference being had to the accompanying drawings, in which—

Figure 1 is a rear elevation of the seeding part of a corn-planter with my device attached; and Fig. 2 is a vertical transverse section on the dotted lines $x\ x$, Fig. 1.

My invention relates to an improvement in that class of check-row corn-planters in which the seed-dropping apparatus is actuated by a spoked wheel, the spokes striking on the ground; and consists, first, in the construction of the wheel, in which the spiral spring operates the supplementary spokes, which work in guides on the fixed spokes; second, in the swivel-coupling to which the end of the shaft is attached, in combination with levers for raising and securing the shaft and the wheel from contact with the ground; and, third, in the combination of a series of pins on the shaft operating against prongs attached to a rod that is connected with levers that operate the seed-slide.

A represents the hub, provided with the fixed spokes $a\ a$. $b\ b$ are the supplementary spokes, working in guides $c\ c$ on the fixed spokes. C C are the springs for returning the supplementary spokes, as is hereinafter described.

D is the shaft, hinged in the swivel-coupling $d$. The shaft is raised up and secured to the standard E by means of the lever $e$ and collar $e'$, which encircles the shaft. The shaft has a bearing in the standard E.

F F are pins on the shaft, which, as the shaft is rotated, strike against the prongs $f\ f$ on the rod G. This rod has an upright lever, H, attached thereto. J is a bar, connecting the lever H and the lever I, which actuates the seed-slide K.

The machine operates as follows, viz: As the planter is drawn across the field the supplementary spokes strike on the ground and rotate the shaft. These spokes, being adjustable by means of sliding in the guides, shorten the spoke as it assumes the perpendicular, and also allows for any obstruction or unevenness of the ground, the supplementary spoke returning by means of the spring as soon as it is off the ground. As the shaft rotates, the pins strike alternately on the prongs, and, through their connection with the levers, actuate the seed-slide.

The swivel-coupling allows the shaft and spoked wheel to be easily raised from the ground through the collar and levers and secured for transportation to and from the field, or in turning the machine at the end of the row, and in starting and stopping of the dropping of the corn.

Having thus described my invention, what I claim as new, and desire to secure by Letters Patent, is—

1. The combination of the spokes $a\ a\ b\ b$, guides $c\ c$, and springs C C, substantially as shown.

2. The swivel-coupling $d$, in combination with the shaft D, in a check-row corn-planter, substantially as and for the purpose set forth.

3. The combination of the adjustable spoked wheel, hinged shaft D, standard E, collar $e'$, and lever $e$, substantially as shown and described.

HICKMAN E. FOSTER.

Witnesses:
 THEO. COLEMAN,
 CHARLES M. FLETCHER.